US012709555B2

(12) United States Patent
Sano et al.

(10) Patent No.: US 12,709,555 B2
(45) Date of Patent: Aug. 18, 2026

(54) DRAINAGE TREATMENT SYSTEM AND DRAINAGE TREATMENT METHOD

(71) Applicant: HITACHI, LTD., Tokyo (JP)

(72) Inventors: Tadashi Sano, Tokyo (JP); U Oh, Tokyo (JP)

(73) Assignee: HITACHI, LTD., Tokyo (JP)

(*) Notice: Subject to any disclaimer, the term of this patent is extended or adjusted under 35 U.S.C. 154(b) by 643 days.

(21) Appl. No.: 18/022,389

(22) PCT Filed: Dec. 2, 2020

(86) PCT No.: PCT/JP2020/044781
§ 371 (c)(1),
(2) Date: Feb. 21, 2023

(87) PCT Pub. No.: WO2022/118382
PCT Pub. Date: Jun. 9, 2022

(65) Prior Publication Data

US 2023/0322584 A1 Oct. 12, 2023

(51) Int. Cl.
*C02F 1/28* (2023.01)
*C02F 103/00* (2006.01)

(52) U.S. Cl.
CPC ........ *C02F 1/283* (2013.01); *C02F 2103/003* (2013.01); *C02F 2303/16* (2013.01)

(58) Field of Classification Search
CPC .......... C02F 1/004; C02F 1/008; C02F 1/281; C02F 1/283; C02F 2103/003; C02F 2209/001; C02F 2209/006; C02F 2209/40; C02F 2209/42; C02F 2209/44; C02F 2303/16
See application file for complete search history.

(56) References Cited

U.S. PATENT DOCUMENTS

2003/0234218 A1* 12/2003 Yang .................... G05B 13/027 210/614
2008/0302715 A1* 12/2008 Venville .................. C02F 1/004 210/283
2018/0194642 A1 7/2018 Ukai et al.

FOREIGN PATENT DOCUMENTS

| | | | | |
|---|---|---|---|---|
| JP | 07-185518 A | | 7/1995 | |
| JP | 2019-166431 A | | 10/2019 | |
| JP | 2020-163299 A | | 10/2020 | |
| KR | 102166937 B1 | * | 10/2020 | ............. B01D 24/46 |
| WO | 2015/033455 A1 | | 3/2015 | |

OTHER PUBLICATIONS

Chinese Office Action received in corresponding Chinese Application No. 202080105030.2 dated Aug. 13, 2024.
International Search Report of PCT/JP2020/044781 dated Feb. 2, 2021.
Extended European Search Report received in corresponding European Application No. 20964236.2 dated Jun. 20, 2024.

* cited by examiner

*Primary Examiner* — Krishnan S Menon
*Assistant Examiner* — Tak L. Chiu
(74) *Attorney, Agent, or Firm* — MATTINGLY & MALUR, PC

(57) ABSTRACT

A drainage treatment system is applied to receive drainage from a large number of factories and overflow while reducing the size of a storage tank. The drainage from the storage tank is purified by a water treatment device having a combination of solid detergent and liquid regenerant, and includes a solid detergent filtering device that performs a purification operation in which the drainage from the storage tank is transformed into purified water. The regeneration device performs regeneration in which impurities absorbed to the solid detergent filtering device are desorbed; and the treatment facility control device acquires operating plan information to predict the amount of drainage discharge from the factories, and to predict the transition of a physical quantity at each part of the storage tank and the water treatment device associated with the predicted amount of drainage discharge, and controls the timing of operation in accordance with the prediction result.

11 Claims, 12 Drawing Sheets

FIG. 1

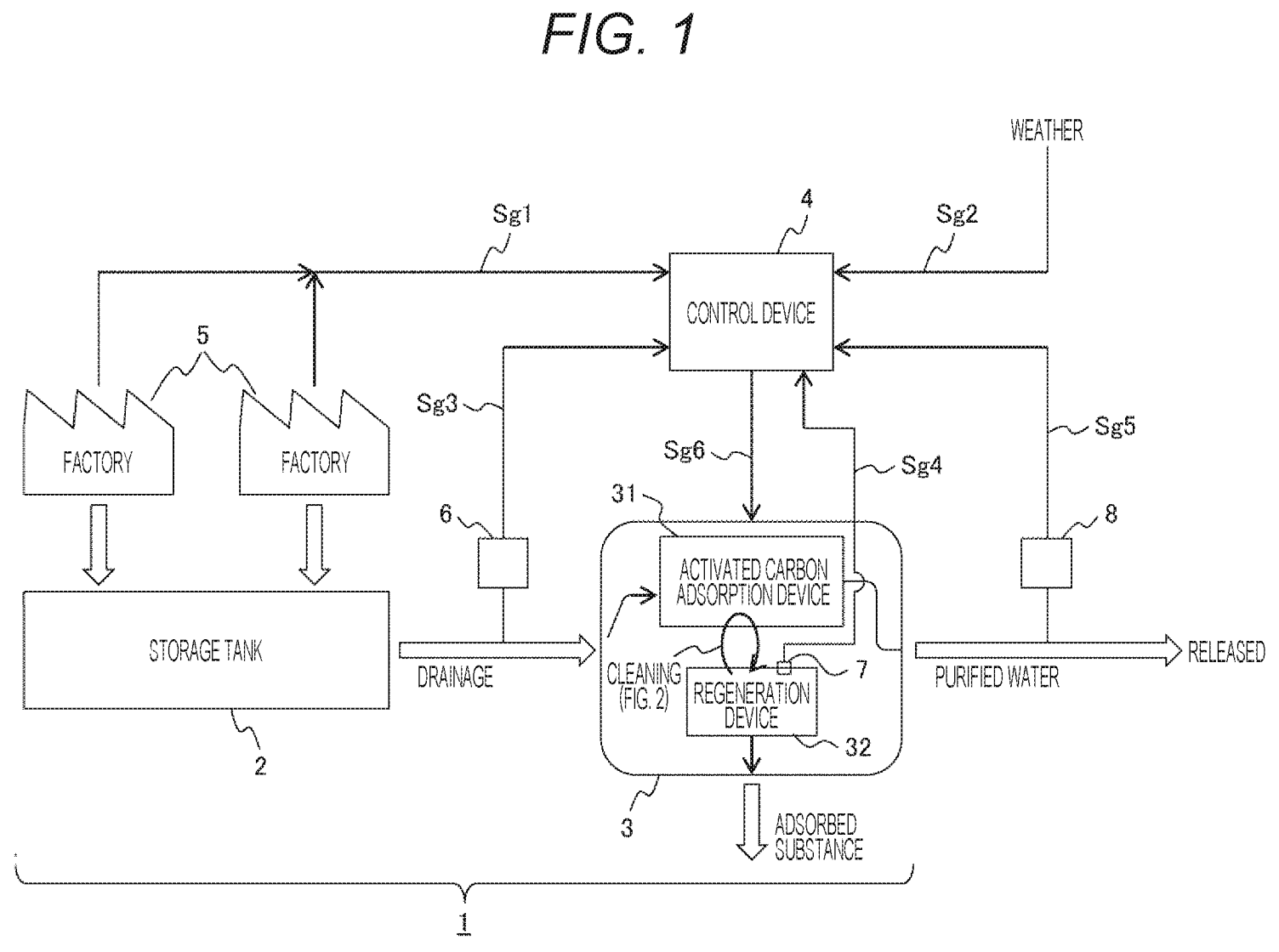

WEATHER
CONTROL DEVICE
4
Sg1
Sg2
Sg3
Sg4
Sg5
Sg6
8
RELEASED
PURIFIED WATER
ACTIVATED CARBON ADSORPTION DEVICE
REGENERATION DEVICE
7
31
32
3
CLEANING (FIG. 2)
ADSORBED SUBSTANCE
DRAINAGE
6
FACTORY
FACTORY
5
STORAGE TANK
2
1

FIG. 3

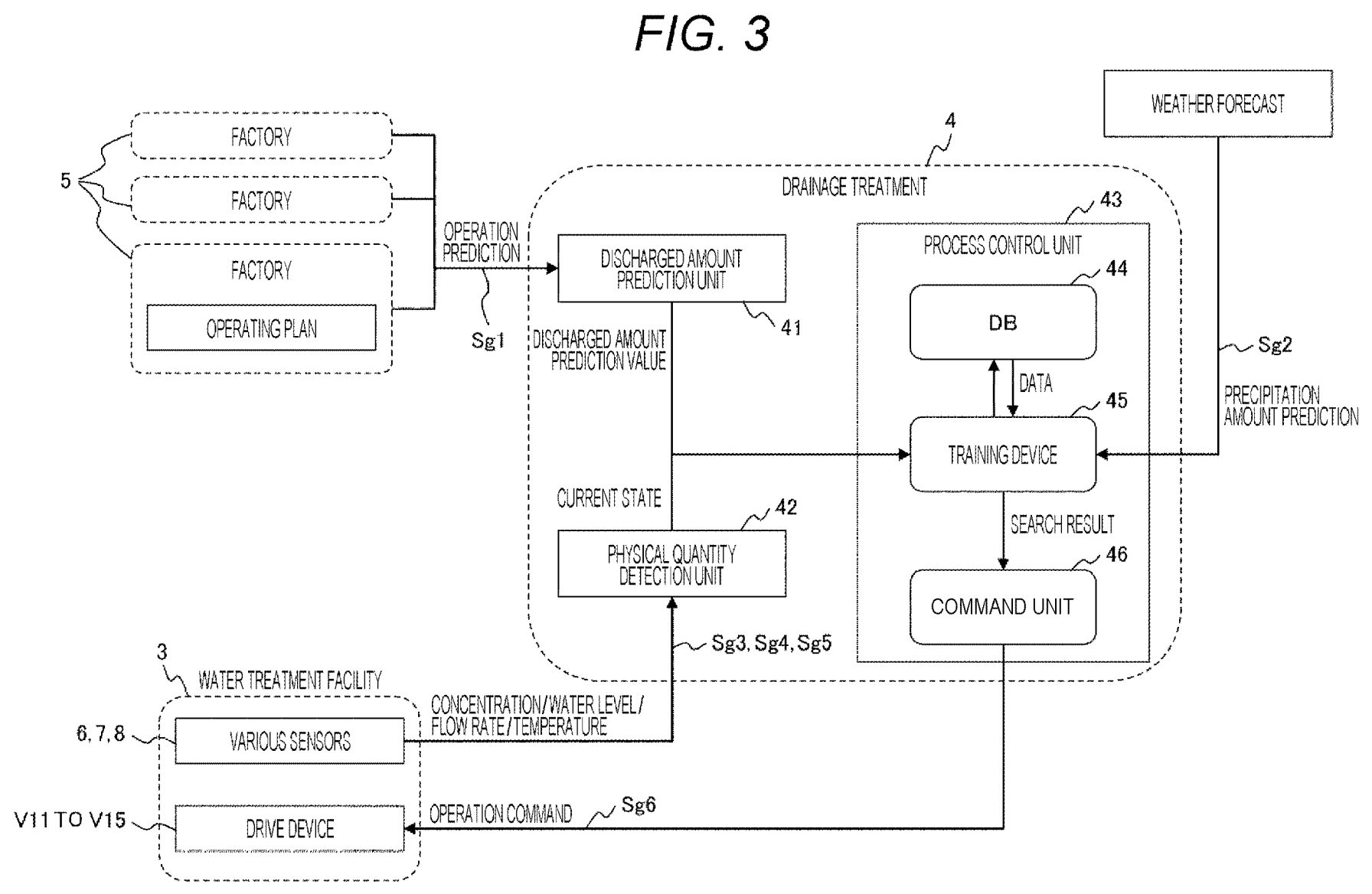

WEATHER FORECAST
Sg2
PRECIPITATION AMOUNT PREDICTION
4
DRAINAGE TREATMENT
43
PROCESS CONTROL UNIT
44
DB
DATA
45
TRAINING DEVICE
SEARCH RESULT
46
COMMAND UNIT
41
DISCHARGED AMOUNT PREDICTION UNIT
DISCHARGED AMOUNT PREDICTION VALUE
CURRENT STATE
42
PHYSICAL QUANTITY DETECTION UNIT
Sg3, Sg4, Sg5
OPERATION PREDICTION
Sg1
FACTORY
FACTORY
FACTORY
OPERATING PLAN
5
CONCENTRATION/WATER LEVEL/ FLOW RATE/TEMPERATURE
Sg6
OPERATION COMMAND
3
WATER TREATMENT FACILITY
VARIOUS SENSORS
DRIVE DEVICE
6, 7, 8
V11 TO V15

WATER LEVEL UPPER LIMIT
CONTAMINATION DEGREE UPPER LIMIT
WATER LEVEL
INFLOW WATER AMOUNT
AMOUNT OF PURIFIED WATER
ACTIVATED CARBON CONTAMINATION DEGREE
SWITCH
REGENERATION
SWITCH
OPERATION STOP
PURIFICATION OPERATION
SWITCH
REGENERATION
SWITCH
OVERFLOW OCCURS
6
5
4
3
2
1
0
-1
t0
t1
t2
t3
t4
t5
t6
t7
t8

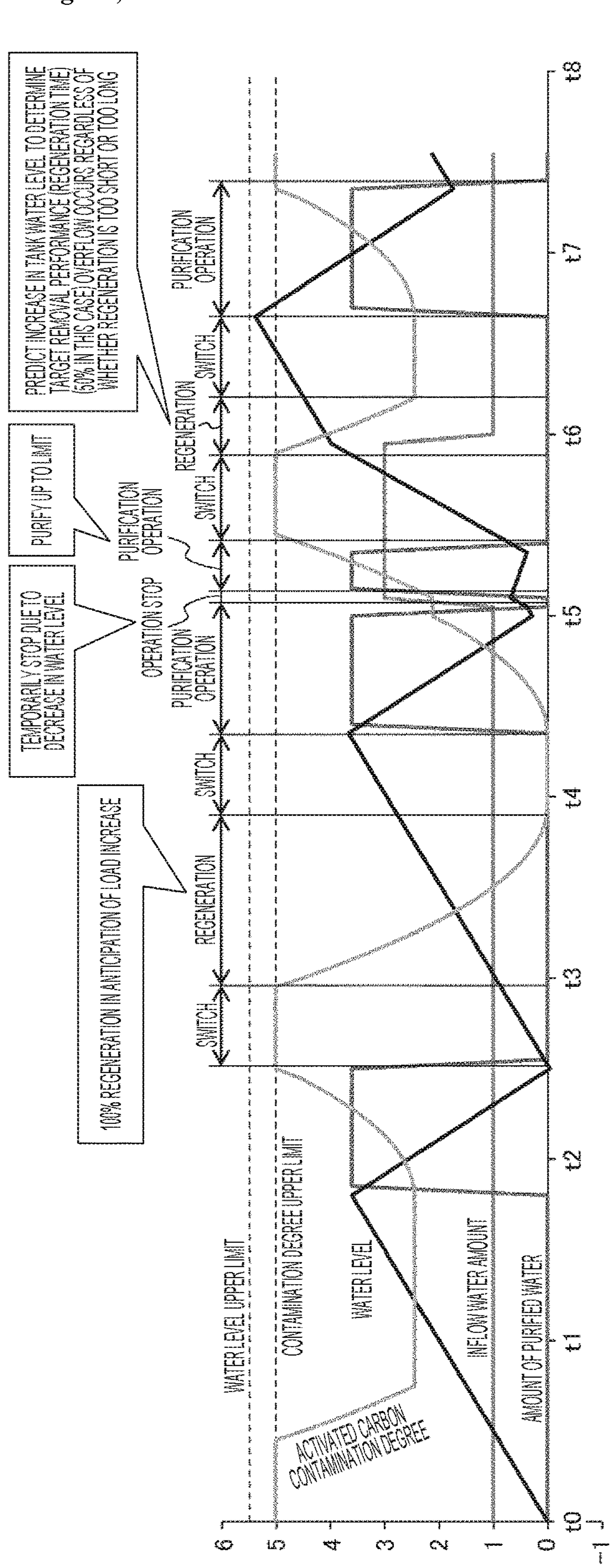
FIG. 6C
WATER LEVEL UPPER LIMIT
CONTAMINATION DEGREE UPPER LIMIT
WATER LEVEL
INFLOW WATER AMOUNT
AMOUNT OF PURIFIED WATER
ACTIVATED CARBON CONTAMINATION DEGREE
100% REGENERATION IN ANTICIPATION OF LOAD INCREASE
TEMPORARILY STOP DUE TO DECREASE IN WATER LEVEL
PURIFY UP TO LIMIT
PREDICT INCREASE IN TANK WATER LEVEL TO DETERMINE TARGET REMOVAL PERFORMANCE (REGENERATION TIME) (50% IN THIS CASE) OVERFLOW OCCURS REGARDLESS OF WHETHER REGENERATION IS TOO SHORT OR TOO LONG
SWITCH
REGENERATION
SWITCH
PURIFICATION OPERATION
OPERATION STOP
PURIFICATION OPERATION
SWITCH
REGENERATION
SWITCH
PURIFICATION OPERATION
6
5
4
3
2
1
0
−1
t0
t1
t2
t3
t4
t5
t6
t7
t8

ELAPSED TIME
REGENERATION
PURIFICATION OPERATION
OPERATION STOP
REGENERATION
PURIFICATION OPERATION
ALLOWABLE CONTAMINATION CONCENTRATION
PURIFIED WATER CONTAMINATION CONCENTRATION
(ACTIVATED CARBON CONTAMINATION DEGREE)

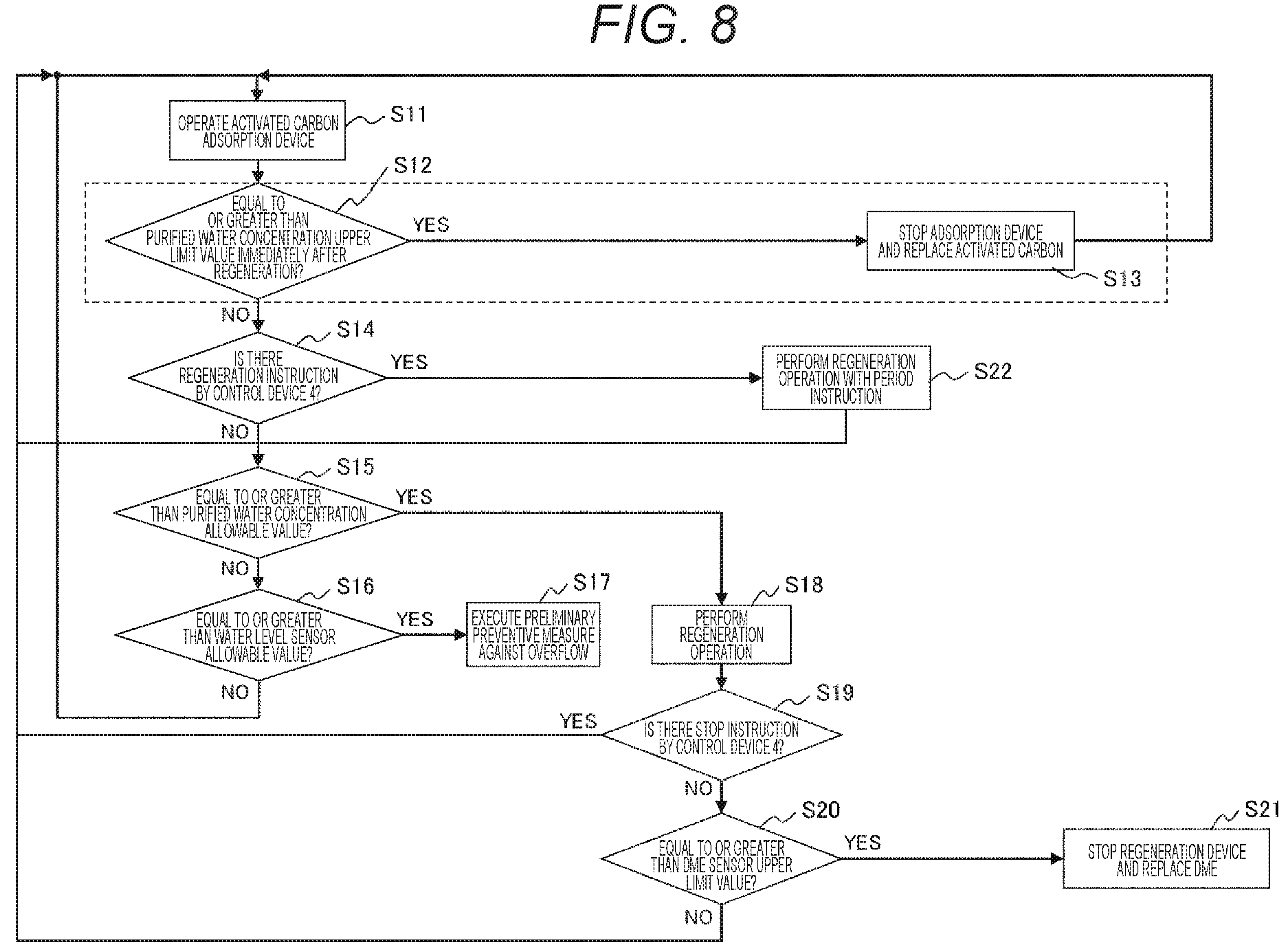
FIG. 8
S11
OPERATE ACTIVATED CARBON ADSORPTION DEVICE
S12
EQUAL TO OR GREATER THAN PURIFIED WATER CONCENTRATION UPPER LIMIT VALUE IMMEDIATELY AFTER REGENERATION?
YES
NO
S13
STOP ADSORPTION DEVICE AND REPLACE ACTIVATED CARBON
S14
IS THERE REGENERATION INSTRUCTION BY CONTROL DEVICE 4?
YES
NO
S22
PERFORM REGENERATION OPERATION WITH PERIOD INSTRUCTION
S15
EQUAL TO OR GREATER THAN PURIFIED WATER CONCENTRATION ALLOWABLE VALUE?
YES
NO
S16
EQUAL TO OR GREATER THAN WATER LEVEL SENSOR ALLOWABLE VALUE?
YES
NO
S17
EXECUTE PRELIMINARY PREVENTIVE MEASURE AGAINST OVERFLOW
S18
PERFORM REGENERATION OPERATION
S19
IS THERE STOP INSTRUCTION BY CONTROL DEVICE 4?
YES
NO
S20
EQUAL TO OR GREATER THAN DME SENSOR UPPER LIMIT VALUE?
YES
NO
S21
STOP REGENERATION DEVICE AND REPLACE DME

DRAINAGE TREATMENT SYSTEM AND DRAINAGE TREATMENT METHOD

TECHNICAL FIELD

The present invention relates to a drainage treatment system and a method for treating drainage from a plurality of factories.

BACKGROUND ART

Various facilities for treating drainage are known, and for example, according to PTL 1, it is possible to realize a more compact drainage treatment facility than the conventional one by purification with an adsorbent and regeneration with a liquefied gas.

CITATION LIST

Patent Literature

PTL 1: WO 2015/033455 A

SUMMARY OF INVENTION

Technical Problem

The treatment facility of PTL 1 has an advantage that the purification treatment of drainage and the regeneration treatment of the adsorbent can be performed compactly and easily, and is promising as a future drainage facility, but a separate storage tank is required at a preceding stage.

Drainage from a factory is stored in the storage tank, it is difficult to predict the fluctuation of the amount of water discharged from the plurality of factories particularly when drainage from a large number of factories is received, so that a huge storage tank is required before the drainage treatment device for the purpose of leveling the inflow amount. In addition, since inundation (overflow) from the storage tank is not allowed, it is necessary to stop the operation of the factory when the water level is high.

In consideration of the above, an object of the present invention is to provide a drainage treatment system and a method suitable for preventing inundation (overflow) while enabling downsizing of a storage tank when receiving drainage from a large number of factories.

Solution to Problem

As described above, according to the present invention, there is provided a drainage treatment system configured to store drainage from a plurality of factories in a storage tank, purify the drainage from the storage tank by a water treatment device including a combination of a solid detergent and a liquid regenerant, and control the water treatment device by a drainage treatment facility control device, wherein the water treatment device includes a drainage treatment facility control device that performs a purification operation in which the drainage from the storage tank is transformed into purified water and a regeneration device that performs a regeneration operation in which impurities adsorbed by the solid detergent filtering device are desorbed, and the drainage treatment facility control device acquires operating plan information from each of the plurality of factories to predict an amount of discharged drainage from each factory, predicts a transition of a physical quantity at each of various locations of the storage tank and the water treatment device at a time of the predicted discharged amount, and controls timing of an operation by the water treatment device in accordance with a result of the prediction. In addition, according to the present invention, there is provided a drainage treatment method for storing drainage from a plurality of factories in a storage tank and purifying the drainage from the storage tank by a water treatment device, wherein the water treatment device performs a purification operation in which the drainage from the storage tank is transformed into purified water and a regeneration operation in which impurities adsorbed to a solid detergent are desorbed, and the method includes acquiring an operating plan information from each of the plurality of factories to predict an amount of discharged drainage from each factory, predicting a transition of a physical quantity at each of various locations of the storage tank and the water treatment device at a time of the predicted discharged amount, and determining timing of an operation by the water treatment device in accordance with a result of the prediction.

Advantageous Effects of Invention

According to the present invention, it is possible to provide a drainage treatment system and a method suitable for preventing inundation (overflow) while enabling downsizing of a storage tank when receiving drainage from a large number of factories.

BRIEF DESCRIPTION OF DRAWINGS

FIG. 1 is a view showing an overall configuration example of a drainage treatment system according to an embodiment of the present invention.

FIG. 3 is a diagram showing a specific configuration example of a drainage treatment facility control device 4.

FIG. 6*c* is a diagram illustrating an effective countermeasure in a state where occurrence of overflow is predicted.

FIG. 8 is a view showing an operation procedure of the drainage treatment system according to the present invention.

DESCRIPTION OF EMBODIMENTS

Hereinafter, embodiments of the present invention will be described with reference to the drawings.

First Embodiment

Figure 2:
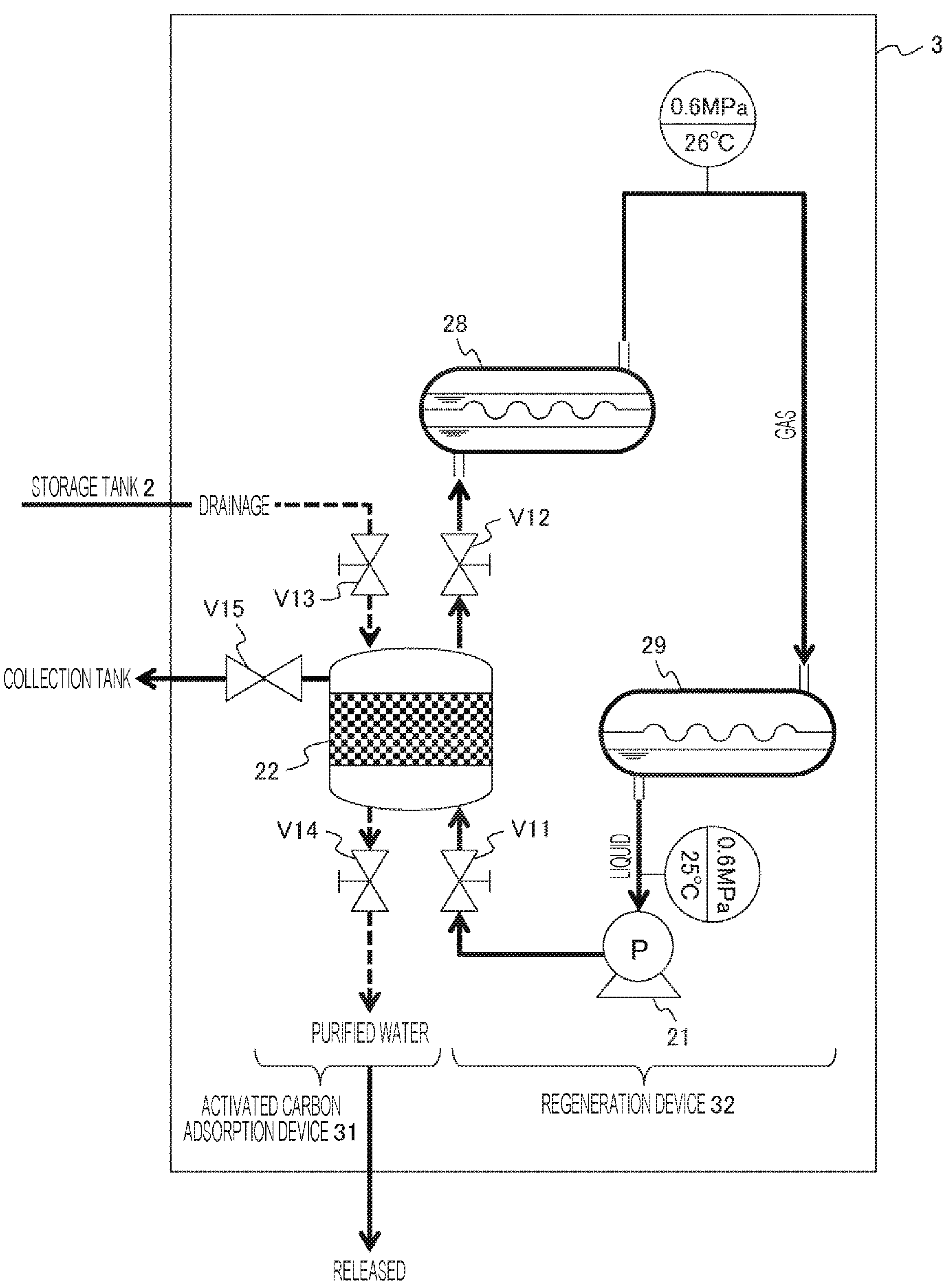
FIG. 2 is a view showing an overall configuration example of an activated carbon filtration/regeneration device to which the present invention is applied.

FIG. 1 illustrates an overall configuration example of a drainage treatment system according to an embodiment of the present invention. A drainage treatment facility 1 includes a storage tank 2 on the upstream side and an activated carbon filtration/regeneration device 3, and is generally controlled by a drainage treatment facility control device 4 including a computer. In the storage tank 2, drainage from a plurality of factories 5 flows in and is stored, and the activated carbon filtration/regeneration device 3 which is a water treatment device purifies drainage using activated carbon which is a solid detergent and discharges the drainage as purified water. Further, the activated carbon filtration facility is subjected to the regeneration treatment due to performance deterioration, and the adsorbed substance (contaminant) generated by the regeneration is appropriately collected. As shown in FIG. 2 and described later in detail, the activated carbon filtration/regeneration device 3 includes an activated carbon adsorption device 31 (solid detergent filtering device) that performs a purification operation in which the drainage from the storage tank 2 is transformed into purified water, and a regeneration device 32 that performs a regeneration operation in which impurities adsorbed by the activated carbon adsorption device 31 are desorbed.

The drainage treatment facility control device 4 controls a regeneration timing, a purification timing, an activated carbon replacement timing, a liquid regenerant replacement/replenishment timing, an adsorbed substance collection timing, and the like for the activated carbon filtration/regeneration device 3. For these treatments, the drainage treatment facility control device 4 of the present invention receives, in addition to operating plan information Sg1 of the plurality of factories 5, weather information (rain information) Sg2, drainage concentration information Sg3 from a concentration sensor 6, contamination information S4 from a DME contamination degree sensor 7 provided in the regeneration device 32 in the activated carbon filtration/regeneration device 3, and purified water concentration information Sg5 from a concentration sensor 8, and determines each timing and the like.

The activated carbon filtration/regeneration device 3 is configured as shown in FIG. 2, for example. The activated carbon filtration/regeneration device 3 of FIG. 2 mainly includes a treatment tank 22, a pump 21, a condenser 29, an evaporator 28, and a plurality of valves V (V11 to V15), performs an activated carbon filtration treatment through a path from the storage tank 2 to the treatment tank 22 (activated carbon adsorption device 31), and performs a regeneration treatment on the treatment tank 22 by regeneration device 32 configured by a path from the treatment tank 22 to the treatment tank 22 again via the evaporator 28, the condenser 29, and the pump 21.

With the above configuration, first, in the normal drainage treatment mode (purification mode), the valves V11, V12, and V15 are closed, and the valves V13 and V14 are operated in an opened state. By bringing drainage from the storage tank 2 into contact with the adsorbent with which the treatment tank 22 is filled, impurities are adsorbed to the adsorbent, and purified water containing no impurities is obtained from the outlet of the treatment tank. When the operation is continued in this state, the adsorption saturation is reached, and the impurities leak. Therefore, the operation is temporarily stopped before the impurities leak, and the mode shifts to the adsorbent regeneration mode. Water is removed from the treatment tank at the time of a transition, and water and impurities remain attached to the adsorbent.

In the adsorbent regeneration mode, the valves V11 and V12 are opened, and the valves V13 and V14 are operated in a closed state. As the liquid regenerant that regenerates the adsorbent, for example, liquefied dimethyl ether (DME) is used as a substance A that is a gas at normal temperature and normal pressure. The substance A is held at a saturated vapor pressure in the circulation path in the regeneration mode, and part of the substance A exists in a liquefied state. In addition, changes in temperature and pressure are described in the figure. They have different values depending on the substance A to be used, but is an example described to describe the flow of energy.

First, the liquefied substance A is extracted from the lower portion of the condenser 29 and fed to the treatment tank 22 through the valve V11 by the pump 21. In the treatment tank 22, the adsorbent is immersed in the fed liquefied substance A. At this time, the impurities adsorbed on the adsorbent are desorbed due to high affinity with the liquefied substance A, and are dissolved in the liquefied substance A together with water. Next, the liquefied substance A in which water and impurities are dissolved is fed to the evaporator 28 through the valve 12. In the evaporator 28, energy corresponding to latent heat for vaporizing the liquefied substance A is supplied, only the liquefied substance A having the lowest boiling point is vaporized, and impurities and water remain. The vaporized substance A is fed to the condenser 29 and cooled, whereby the substance A is liquefied. The liquefied substance A obtained here is fed again to the treatment tank 22 and used again for desorption of impurities from the adsorbent.

By repeating the cycle of the change in state of the substance A a plurality of times as necessary, most of the impurities attached to the adsorbent are desorbed. When the desorption is completed, the valve V12 is closed, the liquefied substance A is extracted from the treatment tank 22 by the reverse rotation of the pump 1 or a separately prepared extraction pump, and then the valve 15 is opened to decompress or open the treatment tank 22 to the atmosphere, whereby the liquefied substance A attached to the adsorbent is vaporized, so that a regenerated adsorbent having restored adsorption capability and being close to a new one can be obtained.

In the present embodiment, the pump 1 is used for circulating the substance A, but its function can be substituted by a compressor. Since the compressor is a device that circulates gas, the compressor may be installed downstream of the evaporator 28 and upstream of the condenser 29 when used in the present embodiment.

FIG. 3 illustrates a specific configuration example of the drainage treatment facility control device 4. The drainage treatment facility control device 4 is generally configured by a computer, and is expressed here for convenience by a processing function executed by the computer. The processing function of the drainage treatment facility control device 4 is configured by a discharged amount prediction unit 41, a physical quantity detection unit 42, and a process control unit 43, and the illustrated embodiment illustrates an example in which a training function is used with the configuration of the process control unit 43. In this case, the process control unit 43 includes a training device 45, a database 44, and a command unit 46. Note that the process control unit 43 may be realized by a general control theory.

The discharged amount prediction unit 41 in the drainage treatment facility control device 4 acquires the operating plan information Sg1 of each of the plurality of factories 5 discharging drainage into the storage tank 2, predicts the amount of discharged drainage from a factory from the operating plan information Sg1, and predicts the total amount of discharged drainage from all the factories. In general, while there is some correlation between the operating plan information Sg1 and the amount of discharged drainage from the factory, there may be a variation factor due to characteristics of devices to be used, and its usage (for example, in a case where a storage tank is provided in a factory and drainage is discharged in a batch processing manner, and the like), seasonal factors, and the like, so that in terms of grasping these relationships, a device configuration in which a more accurate discharged amount can be predicted by applying a so-called training function is preferable. However, in the present invention, it is sufficient that prediction can be performed, and a specific implementation method of prediction is not limited.

The operating plan information Sg1 in this case may be short-term information such as that of the next day, or medium- or long-term information on a weekly or monthly basis, but it is desirable that a time equal to or longer than the regeneration treatment time T for the activated carbon filtration/regeneration device 3 described later can be secured. This means that the operating plan information Sg1 including an operating plan in the future for the time T or more for which the purification treatment of the drainage is switched to the regeneration treatment of the filtration device, and the purification treatment of the drainage is resumed is required.

The physical quantity detection unit 42 detects a concentration, a water level, a flow rate, a temperature, and the like from various sensors. Although only the concentration and contamination degree sensors 6, 7, and 8 are illustrated in FIG. 1, a water level sensor that detects the water level in the storage tank 2, a flow rate sensor that detects the flow rate flowing into or out of the storage tank 2, a temperature sensor that detects the temperature in the activated carbon filtration/regeneration device 3, and the like are provided in addition to these sensors, and are appropriately transmitted to the physical quantity detection unit 42 and used for a subsequent treatment.

Figure 4:
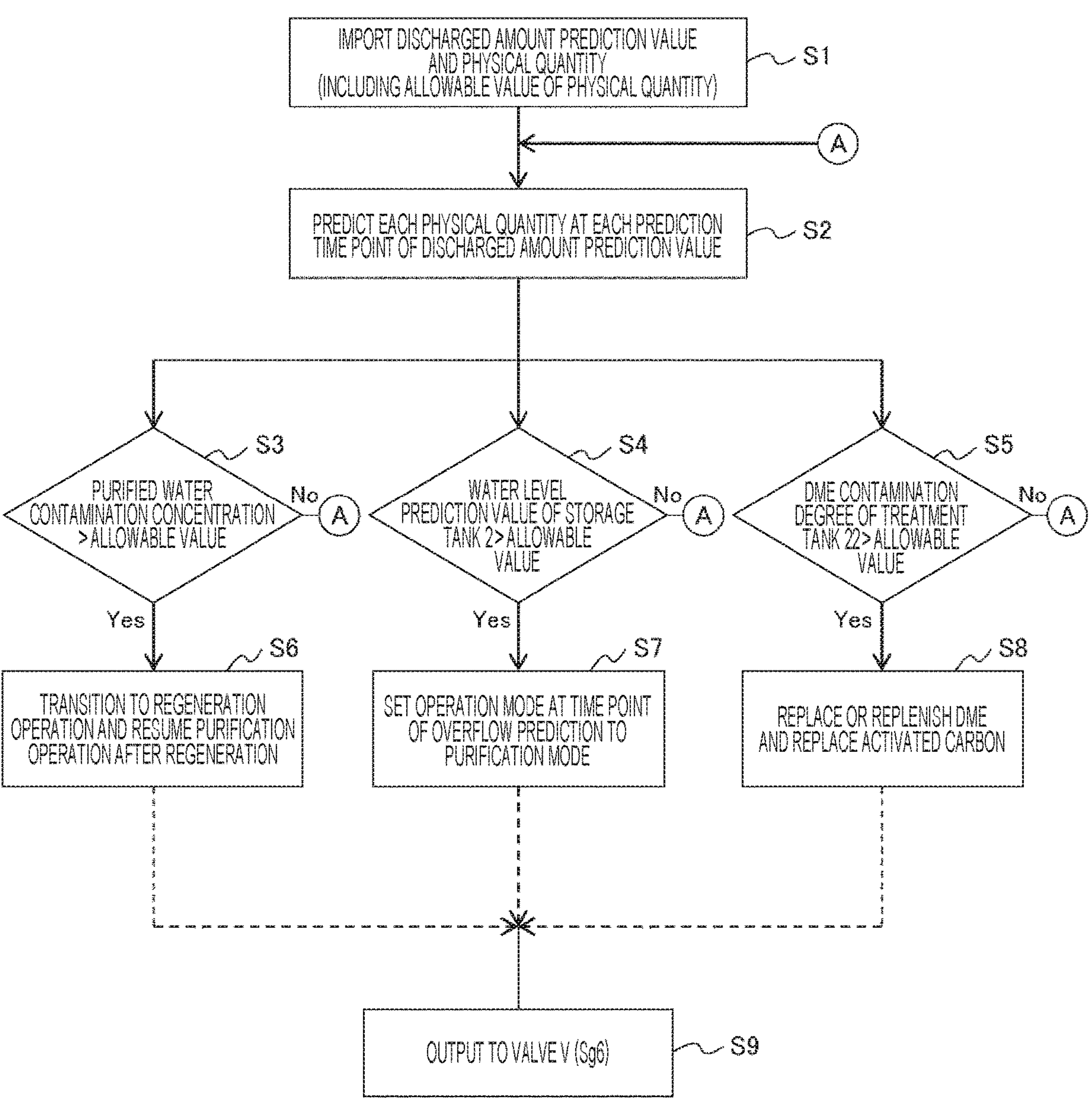
FIG. 4 is a flowchart showing processing contents in a process control unit 43.

Although the process control unit 43 exemplifies the configuration when using the training function, the present invention is not limited to the use of the training function. In short, in the process control unit 43 is required to realize the following processing illustrated in FIG. 4. FIG. 4 is a flowchart illustrating processing contents of the process control unit 43, and it may be useful to use a training function for part of this processing.

In the first processing step S1 of the flow of FIG. 4, the discharged amount prediction value at the future time point predicted by the discharged amount prediction unit 41, various physical quantities at the current time point detected by the physical quantity detection unit 42, the precipitation amount prediction value, and the allowable value (limit value) for each of the physical quantities are imported. In the processing step S2, each physical quantity at the prediction time point of the discharged amount prediction value is estimated and predicted. Note that this processing may be calculated using a causal relationship between physical quantities, or a training function may be used.

In the processing steps S3, S4, and S5, it is confirmed that the contamination concentration of the purified water, the water level prediction value of the storage tank 2, and the contamination degree of a treatment layer 22 to be particularly monitored exceed the respective allowable values as the physical quantities. When it is determined that the allowable value is not exceeded (No), the process returns to the processing step S2, and the above processing is continuously executed. When it is determined that the allowable value is exceeded (Yes), the process moves to the processing steps S6, S7, and S8, and an appropriate countermeasure according to each state is taken.

Here, it is preferable that the contamination concentration of the purified water and the contamination degree of the treatment layer 22 are values at a current time point or a future time point, and the water level of the storage tank 2 is a prediction value at a future time point. That is, it is preferable that regarding the exceeding the allowable values of the contamination concentration of the purified water and the contamination degree of the treatment layer 22, the monitoring result at the current time point (or the prediction result at the future time point) is reflected in the control at the current time point (or the future time point), and regarding the water level of the storage tank 2, prediction control based on the prediction result at the future time point (the control execution time point is the future time point) is performed. As a physical quantity other than the above, there is concentration management of the inflow water. As described in the fourth embodiment about this, it is preferable to apply the prediction control as in the water level of the storage tank 2.

Although the countermeasures in the processing steps S6, S7, and S8 may be individually set in advance, in particular, since the exceeding event of the water level of the storage tank 2 is a predicted event at a future time point, it is possible to take many suboptimal measures between the current time point and the predicted event occurrence time point. Specifically, in a case where the training function is used, it is possible to propose an appropriate countermeasure in consideration of the past cases and the like in a comprehensive manner in the processing step S7.

As a usage scene of the drainage treatment facility control device 4 according to the present invention, it is conceivable to make the drainage treatment facility control device 4 semi-automatic or fully automatic. In the case of the semi-automatic, it is configured as an assistance device, and the countermeasures in the processing steps S6, S7, and S8, the training result in the processing step S7, and the like are visually presented to the administrator together with other information to seek the determination. Note that, in the case of the semi-automatic, it is also useful to present the future prediction result of the contamination concentration of the purified water and the contamination degree of the treatment layer 22 to the administrator and to inform the administrator that a response is required in the near future. When it is fully automated, the determination result is transmitted to the valve V which is an operation end of the activated carbon filtration/regeneration device 3 and the pump (not illustrated) installed in a drainage supply line in the processing step S9, and they are controlled.

Note that an example of the countermeasure in the processing step S6 is a normal operation of shifting to the regeneration operation and resuming the purification operation after completion of the regeneration operation. An example of the countermeasure in the processing step S8 is a normal operation of replacing and replenishing the DME and replacing activated carbon. On the other hand, the countermeasure in the processing step S7 is specific to the present invention, and details thereof will be described later.

Figure 5A:
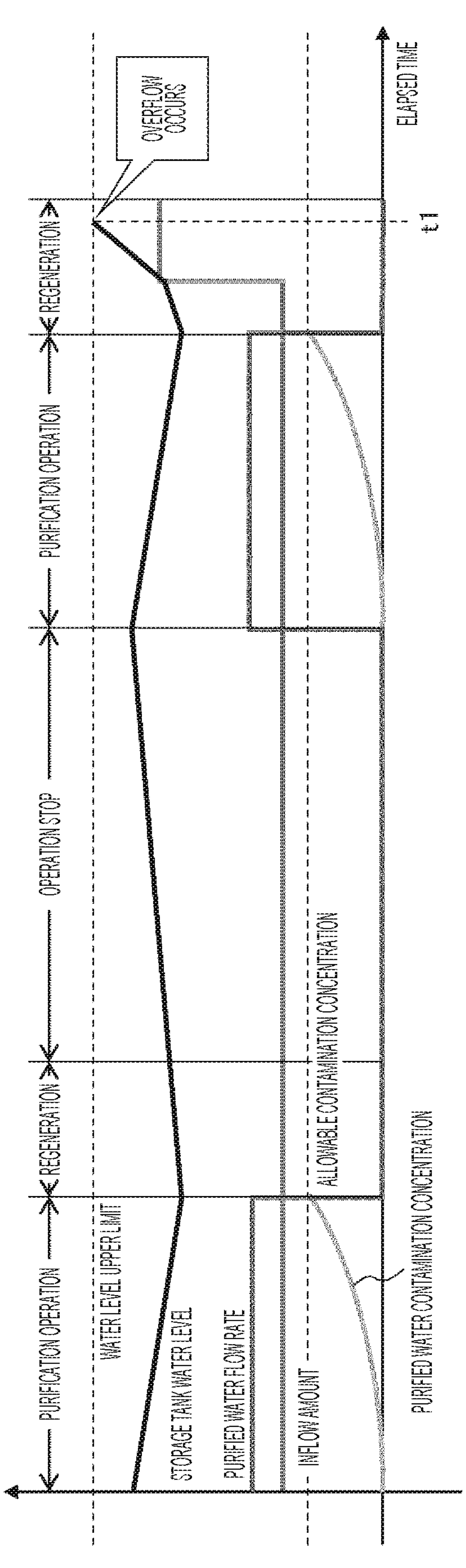
FIG. 5*a* is a view showing an operation example of a conventional drainage treatment facility.

FIG. 5*a* shows an example of a conventional drainage treatment facility operation without using the present invention. In this example, a time-series change example of the water level, the purified water flow rate, the inflow amount, and the purified water contamination concentration of the storage tank 2 is illustrated, and the operation is stopped after the purification operation and the regeneration operation, and the purification operation, the regeneration operation, and the operation stop are repeatedly executed again as a typical pattern.

In this illustrative example, an example in which the purified water contamination concentration and the water level of the storage tank 2 shown in the processing steps S3 and S4 are to be compared with the allowable values and monitored is taken. According to this, the purification operation is switched to the regeneration operation at the timing when the purified water contamination concentration exceeds the allowable value, and after completion of the regeneration, the operation is returned to the purification operation after securing the operation stop period.

On the other hand, it is assumed that during the activated carbon regeneration treatment at time t1 when the supply of drainage from the storage tank 2 to the activated carbon filtration/regeneration device 3 is stopped, drainage from the factory 5 to the storage tank 2 increases, and overflow of drainage occurs in the storage tank 2. FIG. 5*a* is an example of a conventional drainage treatment facility operation, and is a result based on monitoring at the current time and control thereof. Therefore, this overflow cannot be prevented.

Figure 5B:
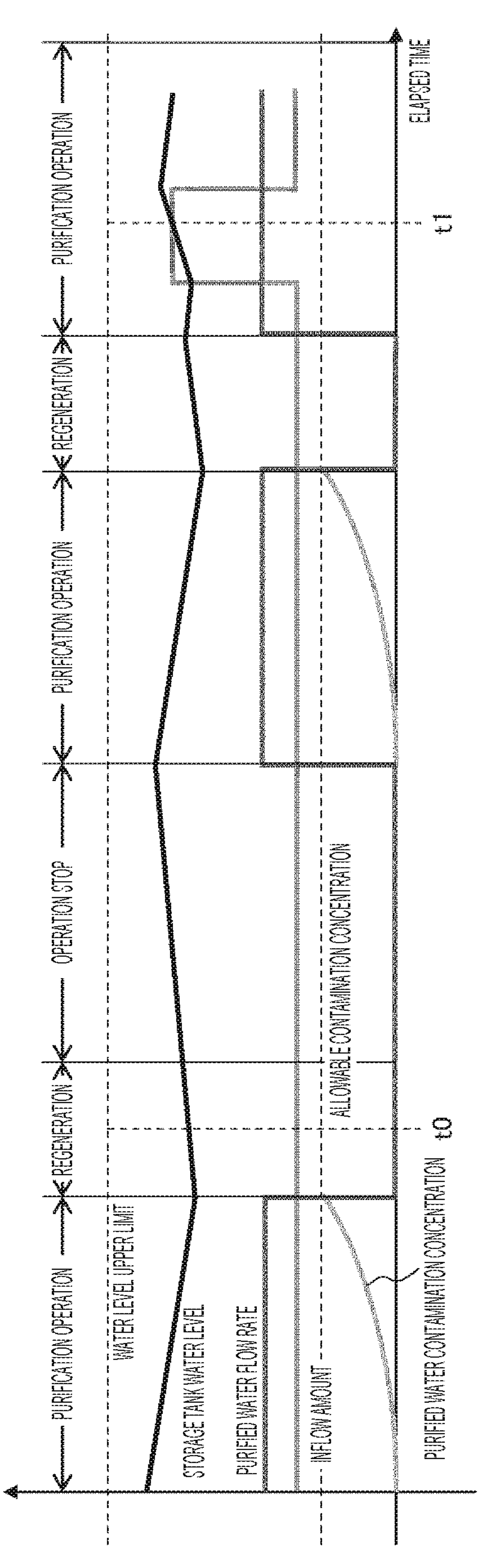
FIG. 5*b* is a view showing an operation example of a drainage treatment facility performing a future prediction according to the present invention.

On the other hand, in a case where the future prediction using the operating plan information Sg1 of the plurality of factories 5 is performed according to the present invention, it is possible to cope with as illustrated in FIG. 5*b*. As a premise of FIG. 5*b*, the current time is, for example, the time point of t0, and a change event such as each physical quantity up to the time point t1 in FIG. 5*a* is predicted.

In this case, the countermeasure in step S7 used by the drainage treatment facility control device 4 according to the present invention is to provide a system capable of treating drainage at the timing of an event in which the drainage from the factory 5 to the storage tank 2 increases by performing the purification operation at time t1. In addition, as a premise, since the purified water contamination concentration is a switching condition from the purification operation to the regeneration operation, a system is provided in which a set operation of one time purification operation, one time regeneration operation, and one time operation stop is completed before time t1, and the purified water contamination concentration is low at time t1. In a specific operation, a set operation of one time purification operation, one time regeneration operation, and one time operation stop is completed within a time secured by shortening the operation stop period. In a state where the purified water contamination concentration is low, the water level of the storage tank 2 can be lowered to secure a sufficient period during which the possibility of overflow is prevented.

As is clear from the above, the countermeasure in step S7 in FIG. 4 is to complete a set operation of one time purification operation, one time regeneration operation, and one time operation stop in advance with respect to the prediction result that the overflow of drainage occurs in the storage tank 2, and to set to be during the purification operation, preferably immediately after the start of the purification operation at the time when the overflow of drainage is predicted.

FIGS. 5*a* and 5*b* show that the control is performed at the preceding stage so as to bring the operation into the regeneration operation at time t1 at which the overflow is predicted. A specific example of a method for realizing this specific countermeasure in relation to the activated carbon contamination degree will be described with reference to FIGS. 6*a*, 6*b*, and 6*c*.

Figure 6A:
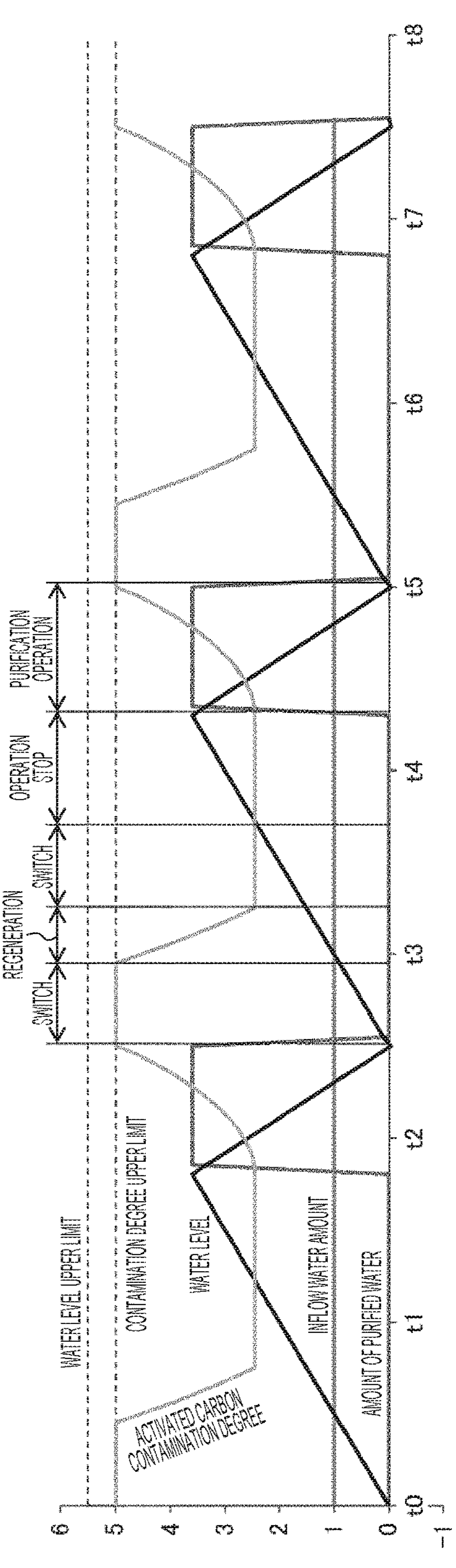
FIG. 6*a* is a view showing an operation example of a drainage treatment facility during a normal operation.

FIG. 6*a* illustrates an operation example of a drainage treatment facility during a normal operation. In this example, the time-series changes in the water level, the purified water flow rate, the inflow amount, and the activated carbon contamination degree of the storage tank 2 are expressed together with the water level upper limit and the activated carbon contamination degree upper limit, and a typical pattern is operated in which the operation is stopped after the purification operation and the regeneration operation, and the purification operation, the regeneration operation, and the operation stop are repeatedly executed again. In this drawing, the switching periods before and after the regeneration operation are also displayed.

The simulation condition assumed here is that the inflow amount is constant, the amount of purified water is 3.6 times, the water level is a difference between inflow and outflow, the mode switching time before and after regeneration is 0.45 hours, the 100% regeneration time is 0.95 hours, and the 50% regeneration time is 0.3 hours, and the water level of ⅔ of the full water is set as the reference for starting the purification operation is that.

Figure 6B:
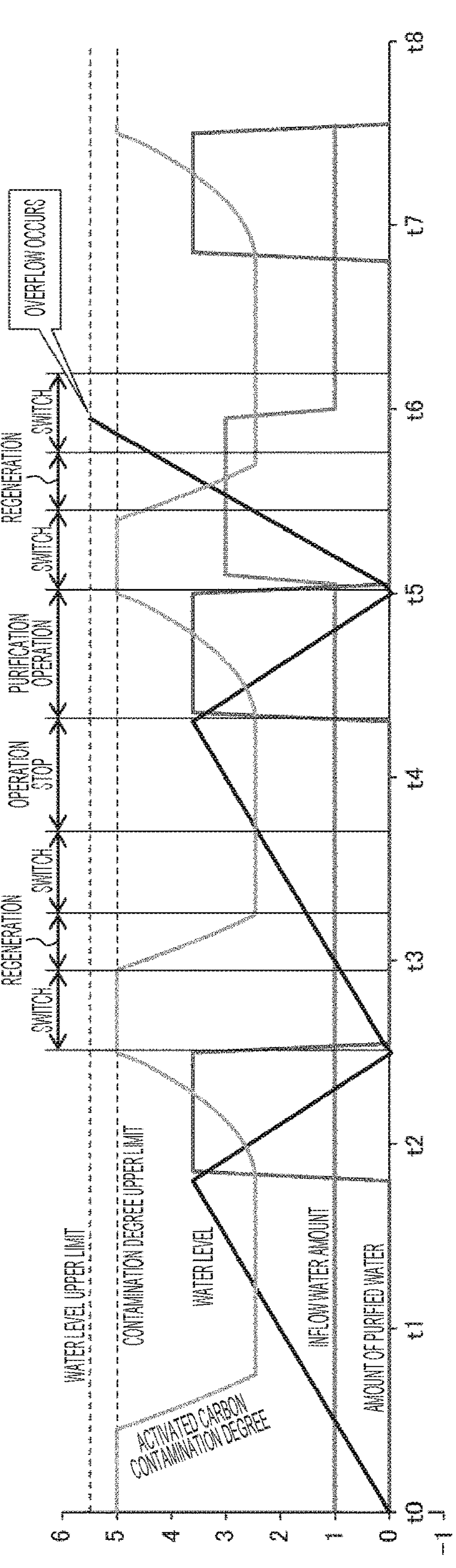
FIG. 6*b* is a diagram illustrating that an overflow current has occurred at t6 which is a future time point as a prediction result.

FIG. 6*b* shows that an overflow current occurred at t6 which is a future time point as a prediction result. Note that time t6 is within the switching time period after the regeneration treatment, but is within the range of the regeneration operation including the switching time period. In any case, since it is not time of the purification operation, water treatment cannot be performed, that is, it is a period in which the water level control of the storage tank 2 is not functioning.

FIG. 6*c* illustrates an effective countermeasure that can be taken between the current time t0 and the overflow time t6 in a state where the occurrence of the overflow is predicted. The countermeasure 1 is to extend the regeneration operation period from time t3 to time t4 so as to achieve 100% regeneration with respect to the degree of activated carbon contamination in anticipation of an increase in load. The countermeasure 2 is to switch the operation stop period after the regeneration to the short time execution a at time t5 after the purification operation, which is temporarily stopped due to a decrease in the water level. The countermeasure 3 is to the purification operation is resumed after the operation is stopped, and performs the purification operation up to the limit.

As a result, the regeneration operation is executed at the overflow occurrence prediction time, but in the regeneration at this time, an increase in the tank water level is predicted to determine the target removal performance (regeneration time) (in this case, 50%), and the overflow occurs regardless of whether the regeneration is too short or too long.

The idea of FIG. 6*c* is the same as that of FIG. 5*b*, and in short, when an overflow due to an increase in load is predicted, the removal performance is recovered to 100% in advance.

Second Embodiment

In the first embodiment, a specific control method is realized by reflecting a prediction result in actual operation using a function of a training device, and this can be said to be a countermeasure at the time of occurrence of abnormality such as overflow. On the other hand, in the second embodiment, reducing the running cost by using the function of the training device will be described with reference to FIGS. 7*a* and 7*b*.

Figure 7A:
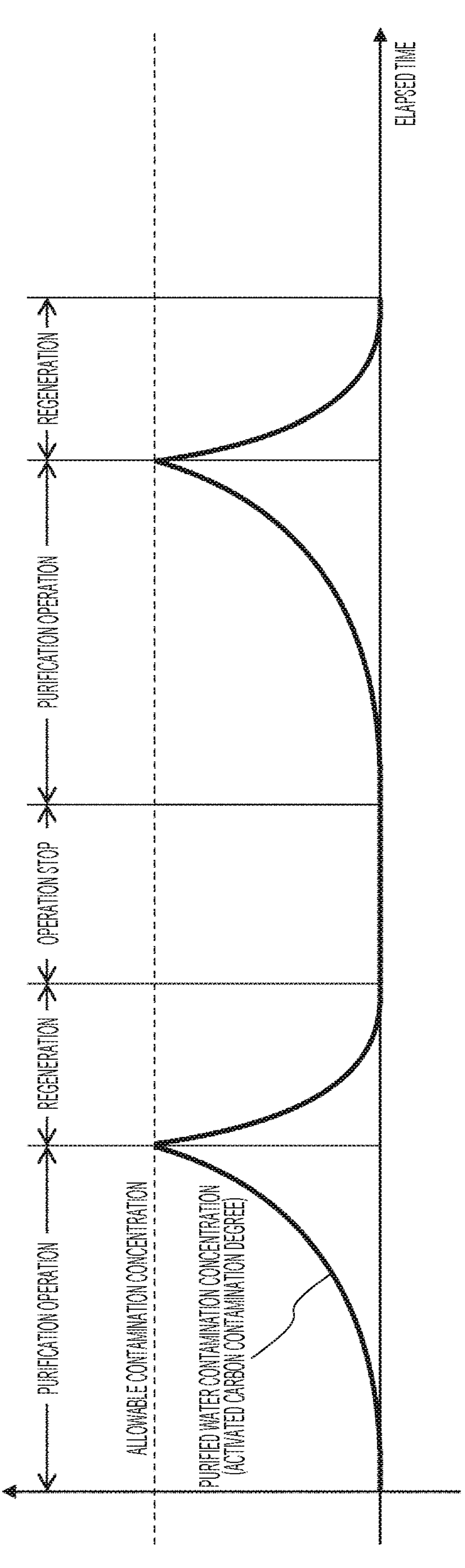
FIG. 7*a* is a diagram showing an example of a normal purification operation.
Figure 7B:
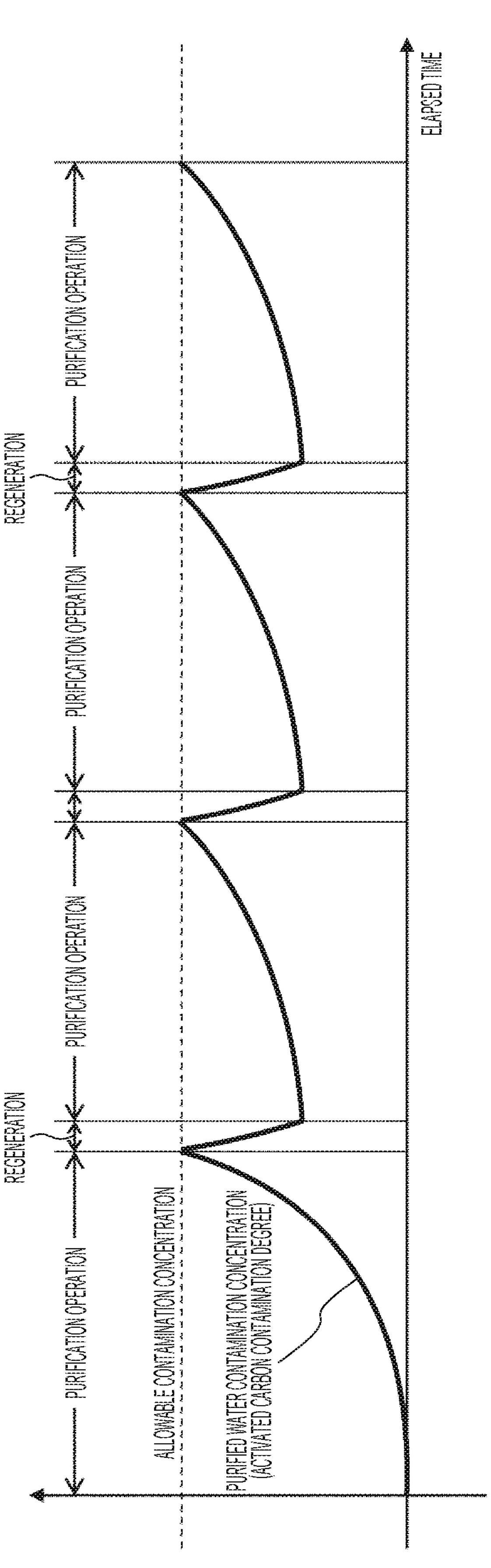
FIG. 7*b* is a diagram illustrating an operation example of a cost-oriented drainage treatment facility performing a future prediction according to the present invention.

FIG. 7*a* shows an example of a normal purification operation, and as in FIG. 5*a*, the operation is stopped after purification and regeneration, and purification, regeneration, and operation stop are repeatedly executed again. On the other hand, when it is known in advance that the amount of discharged drainage from the factories is small and the low load state continues as the discharged amount prediction result from the operating plan information Sg1 of the plurality of factories 5, the regeneration time may be shortened using the prediction result as illustrated in FIG. 7*b*. As a result, the operation is continued while the state in which the contamination degree is high is maintained, and the contamination degree is not lowered. As a result, according to this operation mode, the adsorption and desorption characteristics of the activated carbon can be utilized to lower the regeneration degree, and the regeneration cost can be reduced.

Third Embodiment

In the third embodiment, a general overall operation procedure of the drainage treatment system according to the present invention will be described with reference to FIG. 8. In the first processing step S11 in this flow, drainage is purified by the operation of the activated carbon adsorption device 31 (treatment tank 22), and the regeneration operation is appropriately performed.

In the processing step S12, the purified water concentration immediately after regeneration is compared with its upper limit value. Note that the upper limit value here is not an allowable value as a determination criterion for switching the purification operation to the regeneration operation, but is a criterion for determining that it is time to replace the activated carbon in terms of the purification performance due to deterioration of the activated carbon, and the activated carbon adsorption device 31 is stopped in the processing step 13 due to exceeding of the upper limit value to replace the activated carbon. After the replacement of the activated carbon, the activated carbon adsorption device 31 (treatment tank 22) in the processing step S11 starts to operate. In this case, it is needless to say that the activated carbon adsorption operation is started after it is confirmed that the predetermined performance is achieved.

In the processing step S14, it is checked whether there is a special instruction from the drainage treatment facility control device 4, and when there is the instruction, the process proceeds to the processing step S22, and when there is no instruction, the process proceeds to the normal treatment of the processing step S15. Here, the special instruction from the drainage treatment facility control device 4 is, for example, an instruction about the operation mode illustrated in FIG. 6*b*, and the regeneration operation is performed in the designated execution period, thereby performing the cost-oriented operation. When there is no special instruction, the purified water concentration is compared with an allowable value by the normal treatment in the processing step S15, and when the concentration exceeds the allowable value, the regeneration operation is started in the processing step S18.

When the purified water concentration is equal to or less than the allowable value in the processing step S15, processing step S16 of performing prediction monitoring of the water level of the storage tank 2 is subsequently executed. Here, when there is no abnormality in the transition, the process returns to the processing step S11, and the normal purification treatment (activated carbon adsorption treatment) is continued. When the water level of the storage tank 2 is equal to or greater than the allowable value in the processing step S16, the preliminary preventive measure against overflow at the prediction time point shown in FIG. 5*b* is executed in the processing step S17.

The regeneration operation in the processing step S18 is executed unless there is a stop instruction from the drainage treatment facility control device 4 by the determination in the processing step S19, and the regeneration device is stopped and the DME is replaced in the processing step S20 when there is no stop instruction, and in the processing step S21 when the measurement value of the DME sensor is equal to or greater than the allowable value.

Fourth Embodiment

In the first embodiment, description is made in which the contamination concentration of the purified water, the contamination degree of the treatment layer 22, and the water level of the storage tank 2 are monitored and controlled. On the other hand, in the fourth embodiment, management of the concentration of drainage flowing in from the storage tank 2 will be described.

When the inflow concentration in the storage tank 2 changes, the concentration is relaxed in the storage tank 2 and fed to the activated carbon filtration/regeneration device 3, but even in the case of management of the concentration, the effect of the preliminary countermeasure by the operation change by the concentration change prediction can be expected. Specifically, when the contaminant concentration increases, the amount of water that can be purified decreases, so that the possibility of overflow increases. Also at this time, when an increase in the concentration is predicted in advance, the amount of purified water can be increased by improving the removal performance of activated carbon in advance. Therefore, the method of changing the method of operating the purification facility for predicting the flow rate variation described above can also be applied to the concentration variation.

In the drainage treatment in the first to fourth embodiments, the purification using the activated carbon as the solid detergent and the regeneration using the liquefied gas as the liquid regenerant have been described as an example, but the present invention is not limited to this combination, and other adsorbents and sand filtration can also be used as the solid detergent instead of the activated carbon. For example, sand filtration can physically remove solid materials, and silica gel or alumina gel exhibits an adsorption action in addition to sand filtration, so that dissolved substances can also be removed. On the other hand, activated carbon is different from the above in that the types of substances that can be adsorbed and the adsorption amount can be increased. The regenerating agent to be combined is not limited to the liquefied gas, and an appropriate regenerating agent may be selected from the combination of the object to be removed and the purifying agent.

REFERENCE SIGNS LIST

1 drainage treatment facility
2 storage tank
3 activated carbon filtration/regeneration device
4 drainage treatment facility control device
5 factory
6, 8 concentration sensor
7 contamination degree sensor
8, 21 pump
22 treatment tank
28 evaporator
29 condenser

41 discharged amount prediction unit
42 physical quantity detection unit
43 process control unit
44 database
45 training device
46 command unit
V11 to V15 valve

The invention claimed is:

1. A drainage treatment system, comprising:

a storage tank configured to store drainage from a plurality of factories;

a water treatment device configured to purify the drainage from the storage tank using a combination of a solid detergent and a liquid regenerant; and a drainage treatment facility control device configured to control the water treatment device, wherein the water treatment device includes a solid detergent filtering device that performs a purification operation in which the drainage from the storage tank is transformed into purified water and a regeneration device that performs a regeneration operation in which impurities adsorbed by the solid detergent filtering device are desorbed, and wherein the drainage treatment facility control device acquires operating plan information from each of the plurality of factories to predict an amount of discharged drainage from each factory, predicts a transition of a physical quantity at each of various locations of the storage tank and the water treatment device at a time of the predicted discharged amount, and controls timing of an operation by the water treatment device in accordance with a result of the prediction of the transition of a physical quantity at each of various locations of the storage tank and the water treatment device at the time of the predicted discharged amount.

2. The drainage treatment system according to claim 1, wherein, when an overflow from the storage tank is predicted as a result of the prediction of the transition of a physical quantity at each of various locations of the storage tank and the water treatment device at the time of the predicted discharged amount, the water treatment device is controlled in advance so that the water treatment device performs the purification operation at a time when the overflow is predicted.

3. The drainage treatment system according to claim 1, wherein, when a state in which the discharged amount is small continues as a result of the prediction of the amount of discharged drainage from each factory, timing of an operation by the water treatment device is controlled so that an execution time of the regeneration operation is shortened.

4. The drainage treatment system according to claim 1, wherein the regeneration device is stopped and the liquid regenerant is replaced when a contamination concentration of the liquid regenerant detected by a contamination degree sensor provided in the regeneration device exceeds an upper limit value, in the regeneration operation.

5. The drainage treatment system according to claim 1, wherein the solid detergent is sand.

6. The drainage treatment system according to claim 1, wherein the solid detergent is an adsorbent.

7. The drainage treatment system according to claim 1, wherein the solid detergent is activated carbon.

8. A drainage treatment method for storing drainage from a plurality of factories in a storage tank and purifying the drainage from the storage tank by a water treatment device, wherein the water treatment device performs a purification operation in which the drainage from the storage tank is transformed into purified water and a regeneration operation in which impurities adsorbed by a solid detergent are desorbed, and the method includes acquiring operating plan information from each of the plurality of factories to predict amount of discharged drainage from each factory, predicting a transition of a physical quantity at each of various locations of the storage tank and the water treatment device at a time of the predicted discharged amount, and determining timing of an operation by the water treatment device in accordance with a result of the prediction.

9. The drainage treatment method according to claim 8, wherein when an overflow from the storage tank is predicted as a result of the prediction of the discharged amount and the transition of the physical quantity, the water treatment device is controlled in advance so that the water treatment device performs the purification operation at a time when the overflow is predicted.

10. The drainage treatment method according to claim 8, wherein the solid detergent is an adsorbent.

11. The drainage treatment method according to claim 8, wherein the solid detergent is activated carbon.

* * * * *